Jan. 10, 1939. B. C. VON PLATEN ET AL Re. 20,978

REFRIGERATION

Original Filed Jan. 7, 1928 4 Sheets-Sheet 1

INVENTORS,
Baltzar Carl von Platen
Carl Georg Munters

BY

Thos. J. Hallund
Their ATTORNEY.

REFRIGERATION

Original Filed Jan. 7, 1928 4 Sheets-Sheet 2

INVENTORS
Baltzar Carl von Platen
Carl Georg Munters
BY Jos. Stellund
their ATTORNEY.

INVENTORS
Baltzar Carl von Platen
Carl Georg Munters
BY
their ATTORNEY.

Jan. 10, 1939. B. C. VON PLATEN ET AL Re. 20,978

REFRIGERATION

Original Filed Jan. 7, 1928 4 Sheets-Sheet 4

INVENTORS,
Baltzar Carl von Platen,
Carl Georg Munters,
BY
Wm. Medland
their ATTORNEY.

Reissued Jan. 10, 1939 Re. 20,978

UNITED STATES PATENT OFFICE 20,978

REFRIGERATION

Baltzar Carl von Platen and Carl Georg Munters, Stockholm, Sweden, assignors, by mesne assignments, to Servel, Inc., Dover, Del., a corporation of Delaware Original No. 1,678,277, dated July 24, 1928, Serial No. 245,204, January 7, 1928. Application for reissue November 19, 1938, Serial No. 241,436

16 Claims. (Cl. 62—119.5)

The present invention relates to the art of refrigerating and more particularly to artificial refrigeration employing absorption. Still more particularly the invention relates to refrigerating systems of the kind including a generator, condenser, evaporator and adsorber wherein a cooling agent evaporates in the presence of an auxiliary agent, the auxiliary agent being introduced for the purpose of equalizing the pressure within the system.

Amongst the objects of the invention are to produce high efficiency in refrigerators of the absorption type and particularly to provide an apparatus without moving parts and with equalized pressure wherein there is an evaporation of a plurality of substances for the production of refrigeration while a highly efficient circulation is obtained within the apparatus.

Figure 1:
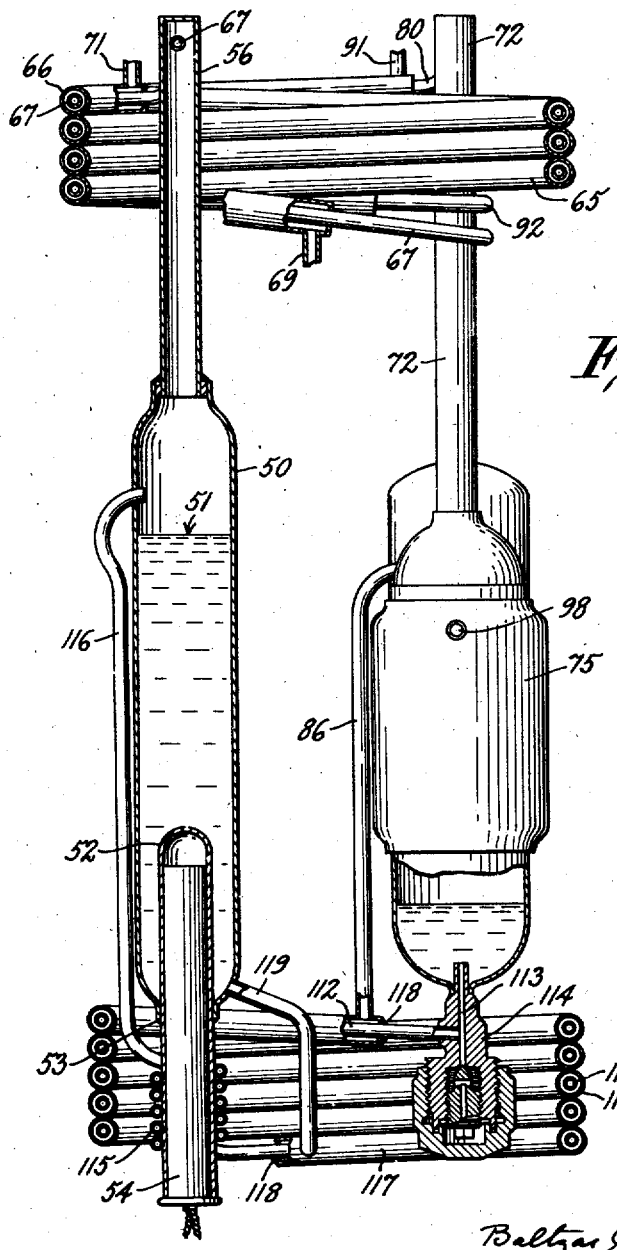
Figure 2:
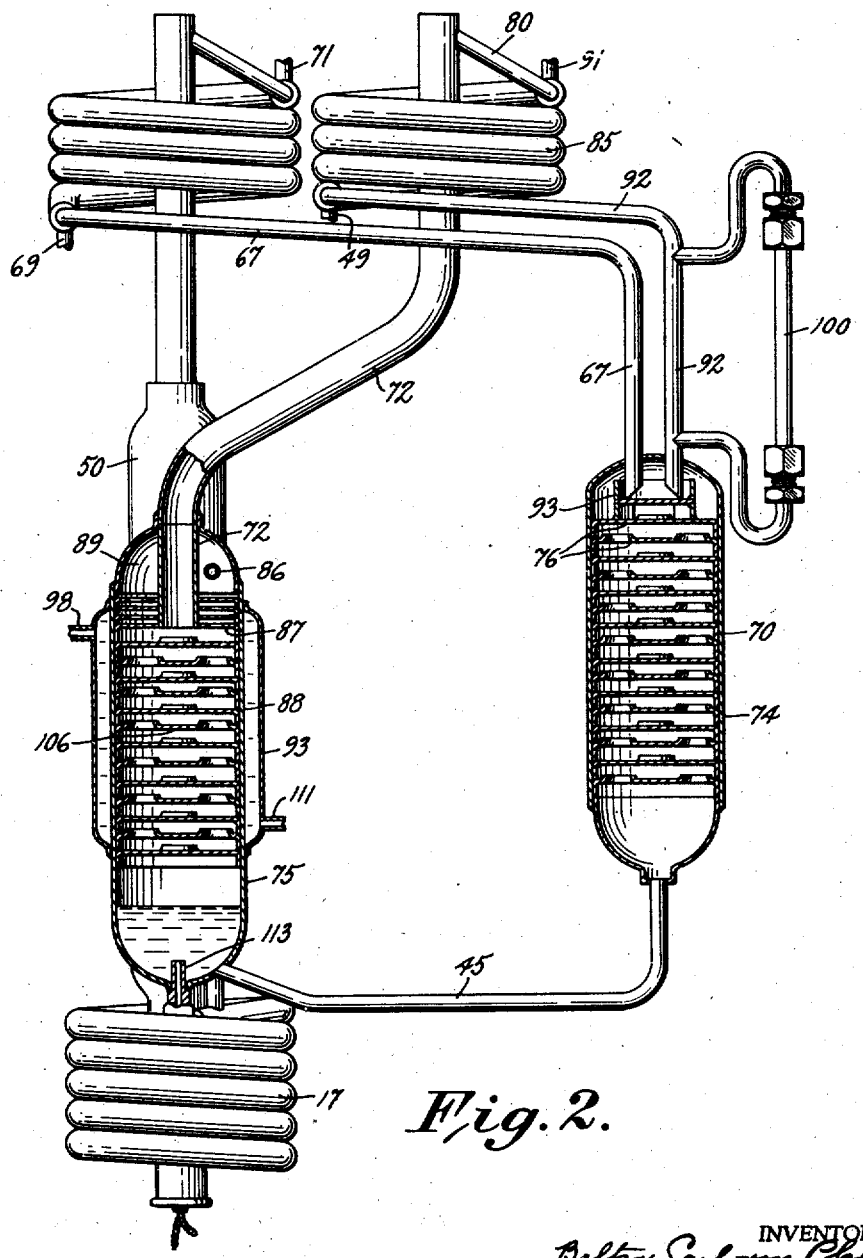
Figure 3:
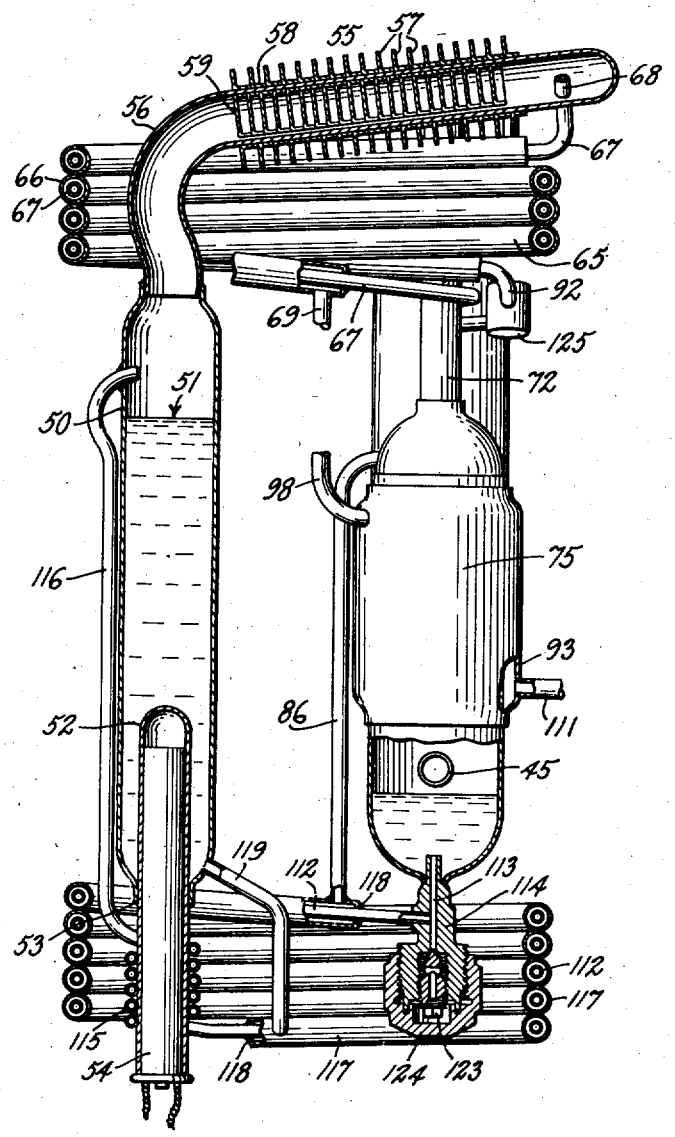
Figure 4:
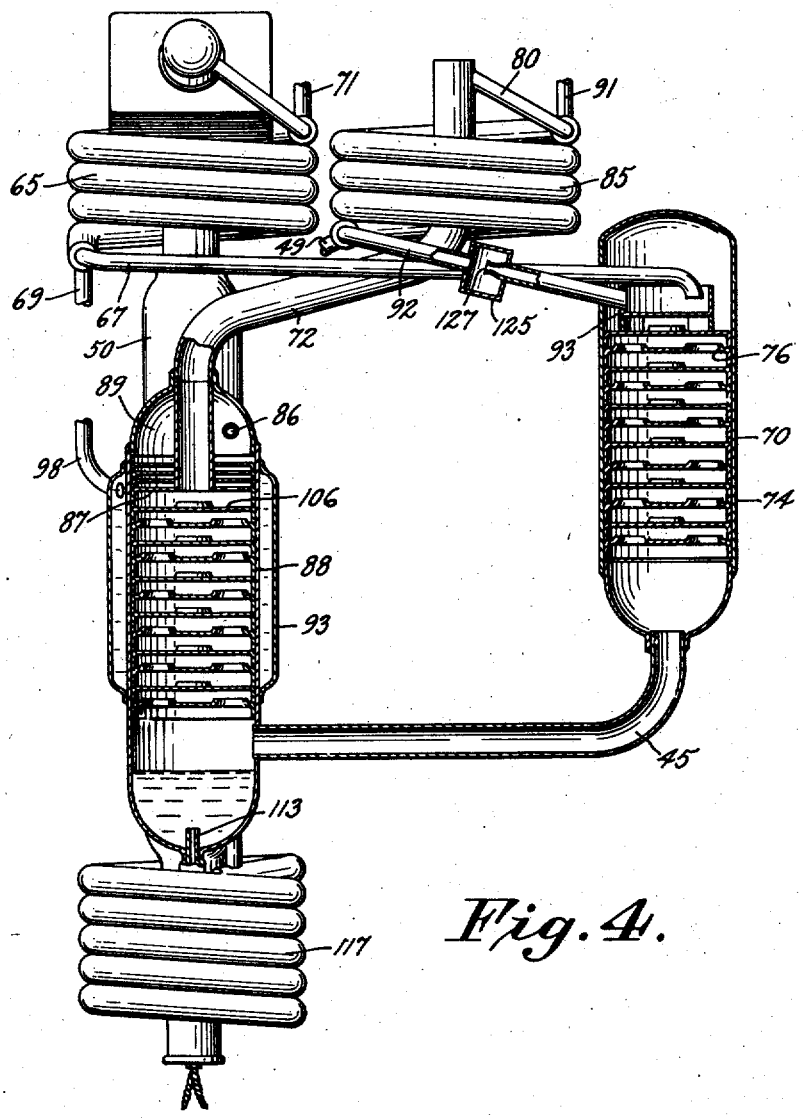

Further objects, advantages, characteristics, features and mode of operation of the present invention will be apparent from the following description taken in consideration with the accompanying drawings on which:

Fig. 1 is a view partly in section of an apparatus built in accordance with the invention; Fig. 2 is another view of the apparatus shown in Fig. 1; Fig. 3 is a view partly in section of a modified apparatus in accordance with the principles of the invention; and Fig. 4 is another view of the apparatus shown in Fig. 3.

In the embodiment shown in Figs. 1 and 2 the generator 50, the absorber 75 and the heat exchanger connected between the same are like the generator, absorber and heat exchanger of Figs. 2, 3 and complementary figures of our Patent No. 1,609,334 granted December 7, 1926. In normal operation the generator is filled with a solution of cooling agent dissolved in absorption liquid to a level of about as indicated by reference character 51. In this apparatus ammonia is used as the cooling agent, distilled water as the absorption liquid and propane as the auxiliary agent. The generator has a heating pocket or chamber 52 situated in its lower portion, closed at the top, open at the bottom, welded to the generator shell proper as indicated at 53 and adapted to receive an electric heating unit or resistance 54. Ammonia vapor expelled from solution in generator 50 passes through conduit 56.

A rectifier may be interposed in conduit 56. The vapor passes from conduit 56 into conduit 67 which is the inside conduit of a condenser designated generally by reference character 65. Condenser 65 is composed of an outer water conduit 66 and an inner ammonia conduit 67. Cooling water is supplied to conduit 66 at 69 and is discharged at 71. After the ammonia has been condensed in condenser 65 it passes on through conduit 67 and into evaporator 70.

A conduit 72 extends upwardly from the upper part of the absorber. To the top of this conduit is connected a conduit 80 which is the inner conduit of a second condenser designated generally by reference character 85. Vapor of propane passes upwardly through conduit 72 and enters condenser 85 where it is condensed. Water is supplied to condenser 85 at 49 and water leaves at 91. This condenser is likewise made up of an inner conduit forming part of the closed refrigeration system and an outer water cooling conduit. After propane is condensed in condenser 85 it passes through conduit 92 to the evaporator 70.

The evaporator is of generally cylindrical formation and like other parts is preferably made of steel. The evaporator comprises an outer shell 74 in which there are a series of plates or discs 76 which may be of the type described in our Patent No. 1,609,334. The discs retain liquid on the same. Liquid ammonia enters the evaporator through conduit 67 and liquid propane enters the evaporator through conduit 92. The liquid is admitted to a cup 93 in the upper part of the evaporator which sets on the uppermost discs 76. The liquid mixes, overflows over the edge of cup 93 and flows downwardly from disc to disc within the evaporator. The two liquids evaporate in the presence of each other and their vapors diffuse into each other. The complementary evaporation and diffusion produces refrigeration by taking up heat from the surroundings. Evaporator 70 would normally be placed inside a space or in contact with material to be cooled. The mixture of gases formed in the evaporator passes downwardly within the evaporator and is forced through conduit 45 to the bottom of absorber 75. In each of vertically extending conduits 67 and 92 there is formed a liquid column. The height of the liquid column in the apparatus being described, is indicated by gauge glass 100. Such a gauge glass would not ordinarily be on an apparatus but Figs. 1 and 2 are reproduced from an actually tested apparatus in which it was desired to determine just where the liquid levels were. The liquid columns in conduits 67 and 92 cause a higher pressure in the evaporator than in the condensers and in the generator and absorber. The higher pressure maintained by these columns serves to force gas out of the evaporator and through liquid in the lower part of the absorber.

In the absorber the ammonia is absorbed by absorption liquid supplied thereto from the generator through conduit 86. The upper portion of the absorber above a disc therein designated by reference character 87 and between the shell 88 of the absorber and conduit 72 forms what may be termed a precooling chamber 89. This precooling chamber 89 has been described in Patent No. 1,609,334 to which reference may be had. The absorber is provided with a series of plates or discs 106 which may be like those of the evaporator and which serve to provide a large surface for gas and liquid contact. The absorption liquid passes through the precooling chamber 89 and flows onto the uppermost disc 106 and thence down over the discs. The absorption liquid absorbs the ammonia liberating the propane and the propane flows upwardly through conduit 72 and to the condenser 85 whence it flows back to the evaporator for repeated complementary diffusion. The absorber is provided with a cooling water jacket 93. The cooling water is supplied through conduit 111 and is discharged through conduit 98. The absorber and condensers may be connected in series or in parallel or in a combination of series and parallel for circulation of water or other cooling fluid.

Circulation between the generator and absorber is effected in the following manner:

The lower part of the absorber which contains strong absorption liquid is connected with a conduit 112. This connection is made through a passageway 113 within a filling member 114. Conduit 112 is formed into several loops which encircle the filling member 114, and the heating pocket 52. This conduit 112 then forms a coil which is indicated by reference character 115, which coil encircles heating pocket 52 and is set into grooves cut in the same, the purpose of the latter arrangement being to give good heat transfer to this coil. Conduit 112 is extended upwardly beyond coil 115 as designated by reference character 116 and opens into the upper part of generator 50 above the level of absorption liquid therein. Surrounding the major portion of conduit 112 is a conduit 117 which is welded at its ends to conduit 112 as indicated by reference character 118. A conduit 119 connects the lower part of generator 50 with one end of conduit 117 and the other end of conduit 117 is connected to conduit 86 which, in turn, is connected to precooling chamber 89.

Heat is transmitted from resistance 54 to coil 115 and causes formation of vapor therein. This lightens the upwardly extending column of liquid within coil 115 and conduit 116 so that this upwardly extending column becomes relatively lighter than the column of liquid measured by the height of liquid in the absorber relative to the position of coil 115 and thus liquid passes upwardly through coil 115 and conduit 116 into generator 50. Supply of absorption liquid to the generator causes a higher level of liquid in the generator than in the absorber and liquid flows by gravity through conduits 119, 117 and 86, from the generator to the absorber. There is thus produced a continuous circulation of absorption liquid between the generator and absorber due to the application of heat to coil 115, which is, in effect, an auxiliary generator.

It will be seen that this modification differs from what is shown in Patent No. 1,609,334 particularly in that both the cooling agent and the auxiliary agent are condensed before introduction into the evaporator and that liquid column means operates to produce a higher pressure in the evaporator than in the generator, absorber and condensers which serves to force mixed gas through absorption liquid in the absorber.

In the modification shown in Figs. 3 and 4, the generator, absorber and heat exchanger connecting the same are the same as in the arrangement of Fig. 1. A rectifier is interposed in conduit 56 and is indicated generally by reference character 55. The rectifier condenses vapor of the absorption liquid to prevent such absorption liquid from passing to the evaporator. The rectifier comprises a series of baffles 59 inside the rectifier conduit 56 which are apertured preferably having apertures in adjacent discs out of alinement. The discs are cut away at the bottom to afford a passageway for condensed absorption liquid to run back toward the generator. A series of air cooling fins 57, having collars 58, surround conduit 56 and serve to transmit heat from within conduit 56 out to the atmosphere.

In this modification, the liquid columns in conduits 67 and 92 of Fig. 2 are omitted. The condensers discharge directly into a cup 93 at the top of the evaporator and the conduits 67 and 92 do not have any vertical extent for providing liquid columns. Interposed in conduit 92 is a gas chamber 125. The portion of conduit 92 which is connected to the evaporator is restricted at its connection with vessel 125 as indicated at 127. The purpose of this vessel is to force into the evaporator any vapor of ammonia which might pass into the propane condenser and which would not condense in the propane condenser. The gas assembles in vessel 125 and due to the restricted opening 127 alternating gas and liquid slugs are formed which serve to carry the gas entering between portions of liquid through conduit 92 into the evaporator.

Conduit 45 is connected to the absorber above the level of liquid therein. The evaporator and absorber are, therefore, at the same pressure.

While we have described several forms of our invention, it will be understood that many other forms are possible and that the principles of operation of the present invention can be carried out independently of any particular type of refrigerating apparatus.

Having thus described our invention what we claim is:

1. Refrigerating apparatus comprising a generator, a condenser, an evaporator and an absorber forming a circuit for a cooling agent and a second circuit for an auxiliary agent comprising said evaporator, said absorber and a second condenser through which the auxiliary agent passes from the absorber to the evaporator.

2. Refrigerating apparatus comprising a generator and a condenser for a cooling agent, a condenser for an auxiliary agent, an evaporator, means to conduct condensates from the condensers and mix the condensates in said evaporator, an absorber, means to conduct gas from the evaporator to the absorber, means to absorb the cooling agent and conduct the same from the absorber to the generator and means to conduct the auxiliary agent from the absorber to the second mentioned condenser.

3. The method of refrigerating which comprises separating a gaseous cooling agent from a solution thereof, condensing the cooling agent, condensing an auxiliary agent, evaporating the cooling agent and the auxiliary agent in the presence of each other to produce refrigeration, absorbing the cooling agent from the evaporated mixture, separating and again condensing the auxiliary agent, and again separating the cooling agent.

4. The method of refrigerating which comprises evaporating a plurality of substances in liquid form in the presence of each other, separating the substances from each other and separately condensing the substances.

5. The method of refrigerating which comprises separating ammonia in gaseous form from a solution thereof, condensing the ammonia, mixing the condensed ammonia with liquid propane, evaporating the liquid mixture, absorbing the ammonia into solution, separating the propane from the solution, condensing the propane, again separating the ammonia from the solution and condensing the same and again mixing the ammonia and propane condensates.

6. Refrigerating apparatus comprising a generator, a condenser, an evaporator, and an absorber forming a circuit for a cooling agent and a second circuit for an auxiliary agent comprising said evaporator and a second condenser through which the auxiliary agent passes.

7. Refrigerating apparatus in which a cooling agent circulates comprising a generator, a condenser, an evaporator in which the cooling agent evaporates in the presence of an auxiliary agent, means to absorb the cooling agent and thereby separate it from the auxiliary agent, means to conduct the cooling agent to the generator and means to condense the auxiliary agent and to return it to the evaporator.

8. That improvement in the art of refrigeration which consists in bringing a mixture of fluids into contact with a medium having a greater affinity to one of the fluids of the mixture than another so that one fluid is absorbed and another is liberated and liquefying the liberated fluid to adapt it to be evaporated for obtaining refrigeration.

9. That improvement in the art of refrigeration which consists in bringing a mixture of fluids into contact with a medium having a greater affinity to one of the fluids of the mixture than another so that one fluid is absorbed and another is liberated, liquefying the liberated fluid, separating the absorbed fluid from said medium and introducing the last separated fluid into the presence of the liquefied liberated fluid.

10. A refrigerating system comprising a generator, an evaporator, an absorber, a plurality of condensers, a circulation coil, means to conduct vapor from said generator into one of said condensers and to conduct liquid from said one of said condensers to the evaporator, means to conduct vapor from said absorber to another of said condensers and liquid from said other of said condensers into said evaporator, means to conduct gaseous fluid from said evaporator into said absorber, means to conduct absorption liquid from said generator to said absorber, means to conduct absorption liquid from said absorber to said coil, means to conduct fluid from said coil into said generator and means to heat said generator and said coil.

11. A refrigerating system comprising a generator, an absorber, an evaporator, a plurality of condensers, means to supply fluid to said condensers from said generator and from said absorber, means to conduct fluid from said condensers to said evaporator, a conduit connecting said evaporator with the lower part of said absorber and means for circulating absorption liquid between the generator and absorber including means for introducing liquid into the upper part of said absorber and removing liquid from the lower part of said absorber.

12. Refrigerating apparatus comprising a generator and a condenser for a cooling agent, a condenser for an auxiliary agent, an evaporator, means to conduct condensates from the condensers and mix the condensates in said evaporator, an absorber, means to conduct gas from the evaporator to the absorber, means to conduct the auxiliary agent from the absorber to the second mentioned condenser, means for circulating absorption liquid downwardly within said absorber and upwardly outside said absorber, into the generator and from the generator to the absorber and means to conduct the cooling agent from the generator to the first mentioned condenser.

13. Refrigerating apparatus comprising a generator, a condenser, an evaporator, an absorber and conduit connections therebetween forming a circuit for a cooling agent, a second circuit for an auxiliary agent comprising said evaporator, said absorber and a second condenser through which the auxiliary agent passes from the absorber to the evaporator, and a third circuit for circulating absorption liquid downwardly within the absorber, from the lower part of the absorber to the generator and back to the absorber and including an upwardly extending heated portion outside the absorber.

14. The method of refrigerating which comprises separating a cooling agent from a solution thereof in a main body of absorption liquid, condensing the cooling agent, condensing an auxiliary agent, evaporating the cooling agent and the auxiliary agent in the presence of each other to produce refrigeration, separating weakened absorption liquid from the main body, absorbing the cooling agent by the separated absorption liquid and separating the same from the auxiliary agent, again condensing the auxiliary agent and returning it to the presence of the cooling agent, and conveying the separated absorption liquid back to the main body by application of heat to a stream thereof.

15. Refrigerating apparatus comprising a generator, a rectifier, a condenser, an evaporator, and an absorber forming a circuit for a cooling agent and a second circuit for an auxiliary agent comprising said evaporator, said absorber, a second condenser, a gas chamber, means to conduct vapor from said absorber to said second condenser, means to conduct fluid from said second condenser to said gas chamber and a conduit connecting said gas chamber with said evaporator having a restricted portion at the entrance thereof from said gas chamber.

16. Refrigerating apparatus comprising a generator, a rectifier, a first condenser, an evaporator, an absorber, a second condenser, means for circulating absorption liquid between the generator and absorber, means for conducting vapor from the generator through the rectifier and to said first condenser, means to conduct vapor from said absorber to said second condenser, means to conduct liquid from each of said condensers to said evaporator comprising a gas chamber interposed between said second condenser and said evaporator and a conduit connection therewith adapted to carry gas between portions of liquid and means to conduct fluid from said evaporator to said absorber.

BALTZAR CARL VON PLATEN.
CARL GEORG MUNTERS.